United States Patent
Kamoshida et al.

(10) Patent No.: US 9,457,422 B2
(45) Date of Patent: Oct. 4, 2016

(54) HEAT RESISTANT ALLOY MEMBER, METHOD FOR MANUFACTURING THE SAME, AND METHOD FOR REPAIRING THE SAME

(75) Inventors: Hironori Kamoshida, Tsuchiura (JP); Shinya Imano, Hitachi (JP); Takehiko Yoshida, Tokai (JP); Seunghwan Park, Mito (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 1093 days.

(21) Appl. No.: 13/529,156

(22) Filed: Jun. 21, 2012

(65) Prior Publication Data

US 2012/0325380 A1 Dec. 27, 2012

(30) Foreign Application Priority Data

Jun. 21, 2011 (JP) ................................. 2011-136874
Oct. 31, 2011 (JP) ................................. 2011-239453

(51) Int. Cl.
*B23K 20/12* (2006.01)

(52) U.S. Cl.
CPC ....... *B23K 20/1255* (2013.01); *B23K 20/1275* (2013.01); *B23K 2203/04* (2013.01); *B23K 2203/08* (2013.01)

(58) Field of Classification Search
CPC ............... B23K 20/122–20/128; B32B 15/01; C22C 1/10
USPC ...... 148/527, 675; 428/637, 680; 228/112.1, 228/2.1, 262.3
See application file for complete search history.

(56) References Cited

U.S. PATENT DOCUMENTS 4,531,981 A * 7/1985 Singer ...................... C21D 1/42
148/405

FOREIGN PATENT DOCUMENTS

| JP | 2001-259824 A | 9/2001 |
|---|---|---|
| JP | 3229556 B2 | 9/2001 |
| JP | 2001259824 A * | 9/2001 |

OTHER PUBLICATIONS

Yutaka S. Sato et al., "Recrystallization in type 304L stainless steel during friction stirring", Acta Materialia 53 (2005) 637-645.
Pilchak et al. "Friction Stir Processing of Investment-Cast Ti-6Al-4V: Microstructure and Properties", Metallurgical and Materials Transactions A, vol. 39., No. 7, Jul. 6, 2007, Springer-Verlag, New York, pp. 1519-1524.

(Continued)

*Primary Examiner* — Jessee Roe
*Assistant Examiner* — Anthony Liang
(74) *Attorney, Agent, or Firm* — Volpe and Koenig, P.C.

(57) ABSTRACT

A heat resistant alloy member that maintains the creep strength and improves the fatigue characteristics is provided. The heat resistant alloy member according to the present invention includes a recrystallized structure layer including finer grains on the surface of the member than those inside of the member. The recrystallized structure layer is formed by forming a stirred layer by giving processing strain to the surface of the member using a friction stir processing, and applying recrystallization heat treatment to the stirred layer for recrystallization.

5 Claims, 3 Drawing Sheets

(56) References Cited

OTHER PUBLICATIONS

Colin J. Sterling, "Thesis: Effects of Friction Stir Processing on the Microstructure and Mechanical Properties of Fusion Welded 304L Stainless Steel", Aug. 2004, Brigham Young University, retrieved from the Internet: http://contentdm.lib.byu.edu/cdm/ref/collection/ETD/id/147.

Pilchak et al. "Microstructural Changes Due to Friction Stir Processing of Investment-Cast Ti-6Al-4V", Metallurgical and Materials Transactions A, vol. 38, No. 2, Feb. 2007, Springer-Verlag, New York, pp. 401-408.

Palko et al. "Investigation of the Use of Friction Stir Processing to Repair and Locally Enhance the Properties of Large Ni Al Bronze Propellers", THERMEC 2003, International Conference on Processing & Manufacturing of Advanced Materials, vol. 426-432, No. 4, Jul. 11, 2003, pp. 2909-2914.

Ni et al. "Corrosion properties of friction-stir processed cast NiAl bronze", Corrosion Science, vol. 52, No. 5, May 1, 2010, Oxford, GB, pp. 1610-1617.

Sorensen et al. "Chapter 6 Friction Stir Welding of Ferrous and Nickel Alloys", Friction Stir Welding and Processing, Jan. 1, 2007, pp. 111-121.

Penn Stainless Products, Inc. : "Alloy 3041304L—UNS S30400/5304033", Aug. 20, 2015, XP055208749, Retrieved from the Internet: Url:http://www.pennstainless.com/wp-content/uploads/2013/09/PSP-Alloy304.pdf [retrieved on Aug. 20, 2015].

\* cited by examiner

US 9,457,422 B2

HEAT RESISTANT ALLOY MEMBER, METHOD FOR MANUFACTURING THE SAME, AND METHOD FOR REPAIRING THE SAME

BACKGROUND OF THE INVENTION

1. Field of the Invention

The present invention relates to a heat resistant alloy member using heat resistant alloy.

2. Background Art

For example, when a large-sized cast member such as a casing for a steam turbine is manufactured, it cannot be easily cooled because of its size and is kept at high temperature for a long time. Because the cooling speed is slow, the grain size especially in a thick portion is increased. When grains are coarse, the creep characteristics (creep strain rate) tend to be structurally favorable. However, the fatigue characteristics may be reduced.

For example, a cast member is used for the casing for the steam turbine, and the thickness of it may be between several tens and hundreds of mm when it is the large-sized (around 10 tons). In such a thick portion, the cooling speed is considerably reduced and grains tend to be coarse. In the casing, a portion where an upper half portion and a lower half portion are connected to each other with bolts is the thickest, and the edges of the bolt holes are prone to cracks due to fatigue. The cast member is also used for a valve for the steam turbine, the similar situation can occur when it is large-sized (several tons or more).

For example, in a combustor liner for a gas turbine, a number of micro cracks may occur by start or stop of operation. It is because the heat stress is generated by heat cycles in which high-temperature and low-temperature are alternately repeated and thus the low cycle fatigue is applied on a material.

A portion exposed to high-temperature steam or combustion gas needs to have the strength at high temperature. Accordingly, a material for such a portion is required to have heat resistance (high temperature strength). From this point of view, the fact that grains are large as in the casing for the steam turbine contributes to improvement of the creep strength at high temperature and reduction of the creep strain rate. However, the fatigue characteristics are reduced when grains are coarse. Furthermore, because the gas turbine often starts and stops, fatigue cracks may occur and expand on its surface by long-term use.

One conventionally known method of improving fatigue characteristics is to make the grains of a material finer (Patent Document 1: JP Patent No. 3229556). To improve the fatigue characteristics, friction stir processing is performed on the surface of an Al cast member for property modification according to Patent Document 1. However, Al alloy does not have the strength at high temperature, and accordingly, it cannot have the high creep characteristics like a high-temperature material used in a high-temperature portion of a thermal power plant.

When cracks occur in the individual members due to fatigue, repair welding is usually carried out. However, weld cracks may occur by the repair welding and thus the steps for repair welding may be increased. When the heat resistant alloy member is a forged member, the strength at a Heat Affected Zone (HAZ) or weld metal portion may be reduced in a weld portion as compared to a base material. Thus, the fatigue strength may be reduced as compared to the base material.

The grain size can be reduced by heat treatment, for example, in ferrite steel. In austenitic steel or Ni-based alloy, however, the grain size cannot be reduced by the heat treatment process. Furthermore, the grain size in a large-sized product or a product having a complicated shape cannot be easily reduced by restriction of power of a forging machine.

In recent years, it is desired that a thermal power plant reaches to high temperature, and accordingly, it is suggested that austenitic steel or Ni-based alloy is used for a high-temperature member. However, when such a high-temperature member is used, the fatigue characteristics may be reduced in a case where a large-sized structural member, which is required to have heat resistance such as a high temperature member of the thermal power plant, is manufactured, or cracks are repaired. Consequently, the reliability of the large-sized structural member may be reduced.

An object of the present invention is to provide a heat resistant alloy member that maintains the creep strength and improves the fatigue characteristics (suppressing the occurrence of cracks and their progress) of a large-sized heat resistant alloy material that tends to include coarse grains, and a method for manufacturing the same.

Another object of the present invention is to provide a method for repairing a heat resistant alloy member that prevents reduction of fatigue characteristics caused by repair of cracks that have occurred on a surface of the heat resistant alloy member.

SUMMARY OF THE INVENTION

A heat resistant alloy member according to an aspect of the present invention includes a recrystallized structure layer including fine grains on the surface of the member, which are finer than those inside of the member.

According to the present invention, the occurrence and progress of fatigue cracks are suppressed because the recrystallized structure layer includes grains on the surface of the member which are finer than those inside of the member. Because the grains inside of the member are larger than those on the surface of the member, the creep strength inside of the member is high. Thus, a heat resistant alloy member that improves the fatigue characteristics and the reliability while maintaining the high creep strength can be provided. Problems, structures, and advantageous effects other than those mentioned above will be explained with reference to embodiments.

DETAILED DESCRIPTION OF THE PREFERRED EMBODIMENTS

The inventors prepared for a large-sized cast using an LN625 material as a Ni-based material, which is used for a casing of a steam turbine in an advanced ultra super critical coal-fired power plant (A-USC). When the cross-section of the test piece was observed, the grain size was large. Its diameter was approximately 70 mm at the maximum. Test pieces were obtained in the vicinity thereof, and low-cycle fatigue tests were carried out. Consequently, it was found that the variation was large and the reliability as a material for the steam turbine was low.

Fatigue cracks of the material occur from the surface of the material as long as there are no inclusions inside. The cracks that occur from the surface of the material are promptly spread inside of the material when grains are coarse over an entire thick portion. Accordingly, the reduction of fatigue characteristics and the occurrence of variations may be caused. Several runs of the low-cycle fatigue test were carried out under the same conditions, and the number of cycles to fracture varied by up to one order of magnitude. It was obvious that, when grains were large, the creep strength was structurally high and the creep strain rate was slow. It was required to maintain the creep characteristics of a heat resistant material and improve the fatigue characteristics.

Thus, a method for providing a fine surface structure of the material where cracks occur and preventing the occurrence of fatigue cracks needs to be studied. Accordingly, the friction stir processing (hereinafter referred to as FSP) was tested on the material. Specifically, a method for pressing a rotary tool to the material, stirring the surface of the material with the rotary tool to cause plastic flow, and introducing strain (processing strain) to the material was carried out. By this method, a lot of strain (dislocation) was introduced on the surface of the material. Then, heat treatment was carried out for two hours at 1050° C. to recrystallize. Consequently, it was found that the grain size is reduced to be several tens of μm on a layer stirred by the FSP.

Figure 1:
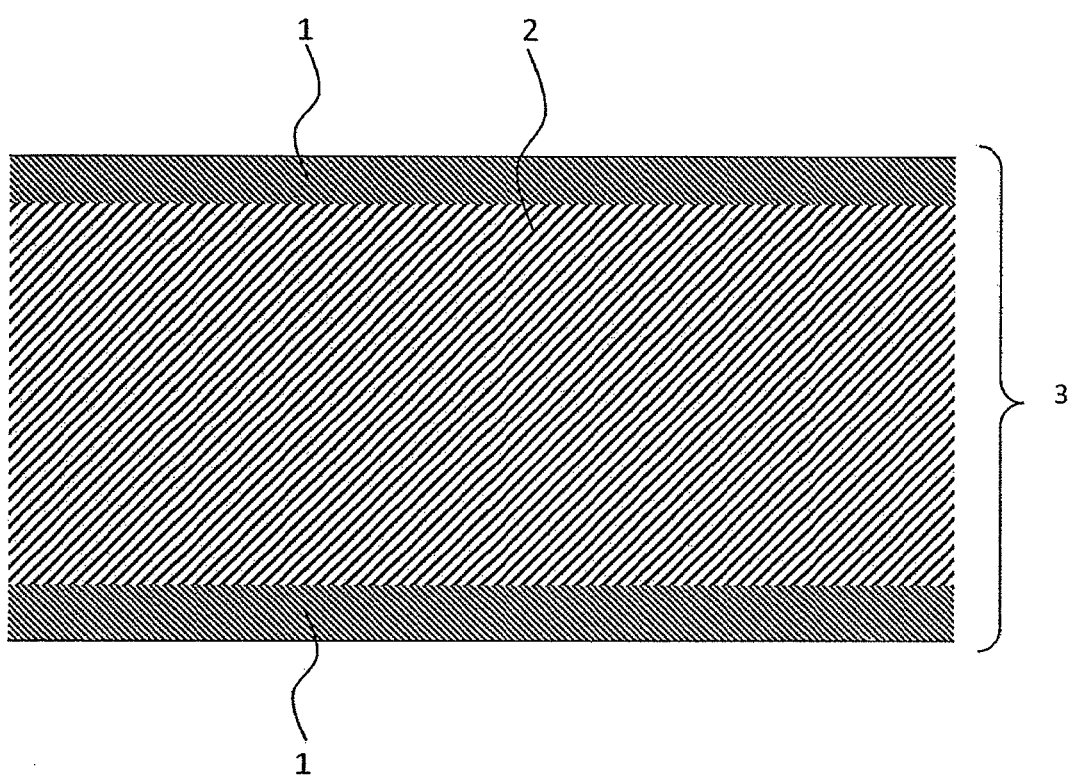
FIG. 1 is a cross-sectional schematic view of an example of a large-sized heat resistant cast alloy according to the present invention.

FIG. 1 is a schematic view showing a cross-section of a structure of a large-sized heat resistant cast member according to the present invention. The inside of the large-sized heat resistant cast member 3 has a structure including coarse grains (coarse grain layer 2), and exhibits structurally favorable creep strength and creep strain rate. By the above-mentioned FSP and subsequent recrystallization heat treatment, the surface of the member has a recrystallized structure including sufficiently fine grains compared to those inside of the member (recrystallized grain layer 1).

An embodiment of the present invention will be explained below in detail. The present invention is not limited to the embodiment described below, and various combinations and modifications may be made to the embodiment without departing from the spirit and scope of the present invention.

A heat resistant alloy member according to the present invention is a Ni-based member used for a high-temperature member of a thermal power plant. The inside of the member has a structure including large grains, and the surface of the member includes fine grains. In other words, the surface of the member has a recrystallized structure including grains finer than those inside of the member.

The average grain size on the surface of the member is preferably 100 μm or less, and more preferably 1 μm or more. The grain size inside of the member is not particularly limited as long as it is larger than the gain size on the surface of the member. When the grain is coarse, for example, when the average grain size is 1 mm or more, the advantageous effect brought by the present invention is increased. The fatigue characteristics and the reliability can be effectively improved.

The thickness of the recrystallized structure layer on the surface of the member is preferably 1 mm or more and 5 mm or less from the surface of the member.

For providing such a structure, processing strain is given to the surface of the member by the friction stir processing is thereafter applied, and the recrystallization heat treatment.

The large-sized heat resistant cast member according to the present invention will be explained below in detail.
(Material)

A material used for a high-temperature member in a thermal power plant is used according to the present invention. Specifically, a Fe-based material (such as ferrite steel and austenitic steel) is used. Furthermore, a Ni-based material can be used as development aiming for high efficiency of a coal-fired power plant is advanced in recent years. When ferrite steel is used, a structure can be made finer by heat treatment. The advantageous effect of the present invention is further effectively provided when austenitic steel or Ni-based material, in which such treatment is difficult, is used.

The material can be effectively used for a large-sized cast which tends to include large grains (for example, a casing or valve for a steam turbine) or a combustor liner for a gas turbine operated under severe thermal fatigue environment in which fine fatigue cracks occur after long-term operation, but the present invention is not limited thereto.

The cooling speed of austenitic steel or Ni-based material during casting becomes slower as a cast member is larger, and thus the grain size is increased. For example, the grain size may become approximately several tens of mm.

The combustor liner for the gas turbine is a forged member, and accordingly, grains are smaller as compared to the cast member. However, fine fatigue cracks occur due to thermal fatigue and the like when it is used for a long period. When the depth of the crack is less than the depth of the tool in the friction stir processing, the cracks can be repaired due to the method according to the present invention.

The material is a Fe-based material or Ni-based material (material having 50 mass % of one or both of Fe and Ni) of a heat resistant material mainly used in a thermal power plant as mentioned above. However, its members are not particularly limited. It can be applied to a material having large grains and a material on the surface of which fine fatigue cracks occur due to fatigue.
(Grain Size)

The average grain size in the recrystallized structure layer on the surface of the member is 100 μm or less. When the size is 100 μm or less, the fatigue characteristics and the reliability can be sufficiently improved. The fatigue characteristics become more superior as the grain size is smaller, and accordingly, the lower limit of the size is not particularly decided.

The grain size inside of the member is not also particularly limited. When the average grain size inside of the member is 1 mm or less, it is not effective to provide smaller grains only on the surface of the member. Accordingly, it is desired that the average grain size inside of the member is 1 mm or more. The fatigue characteristics are improved more effectively as the particle size of the grain inside of the member is larger.
(Thickness of Recrystallized Structure Layer)

The thickness of the recrystallized structure layer (fine structure layer) on the surface of the member is 1 mm or more and 5 mm or less. When the recrystallized structure layer is thinner than 1 mm in the member having the thickness of more than 10 mm, the advantageous effect cannot be sufficiently obtained. The grain size may reach to the size of a large grain inside of the member right after a crack occurs, and then the crack may expand rapidly.
(Method of Making Grains Finer)

Figure 2:
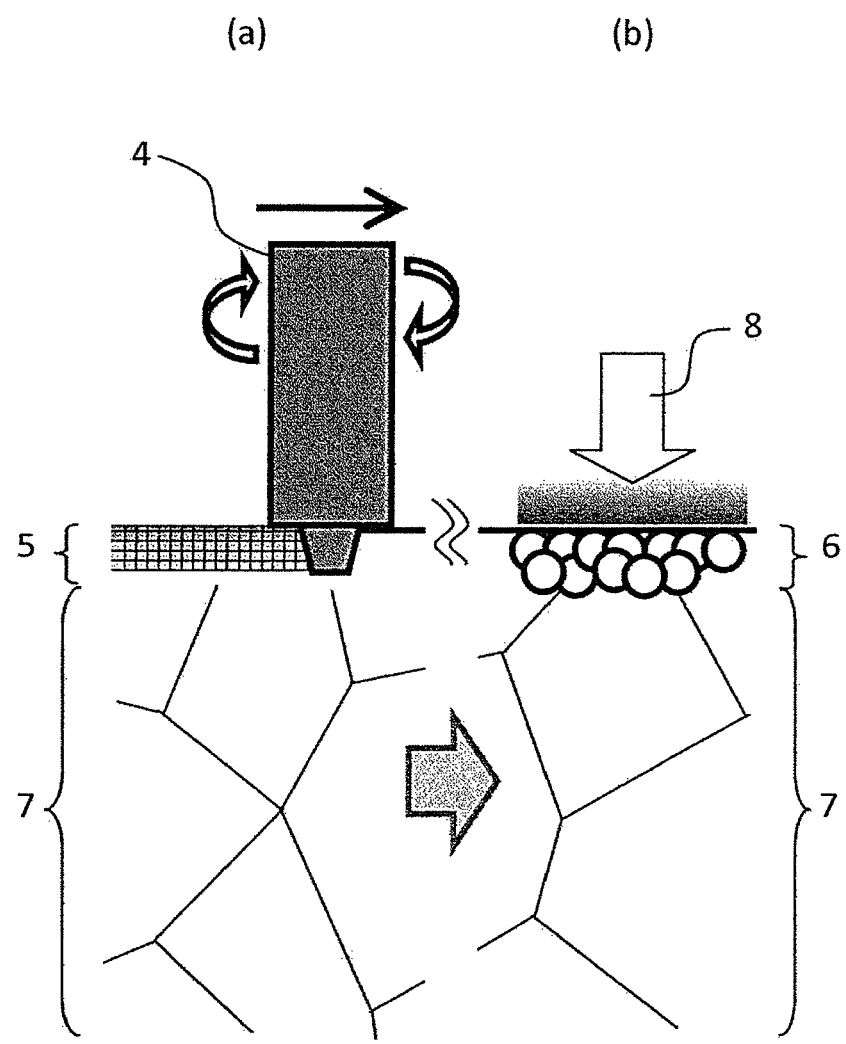
FIG. 2 is a schematic view of a friction stir processing.

The friction stir processing (FSP) is used to provide the above-mentioned structure. FIG. 2 is a schematic view showing a method for applying the process. As shown in FIG. 2(a), a rotary tool 4 is pressed against the surface of the member having a coarse grain and is moved along the surface of the member, so that processing strain is introduced to the surface of the member and a stirred layer 5 is formed. Then, as shown in FIG. 2(b), heat treatment 8 is performed at a recrystallization temperature or more on the member, to whose surface the processing strain has been introduced. Consequently, a recrystallized structure layer 6 in which grains are made finer is formed. The recrystallization temperature depends on which material is used. The temperature for the heat treatment is not particularly limited as long as it is the recrystallization temperature or more. When the recrystallization heat treatment is applied, the heat treatment conditions may be adjusted to obtain the grain size for that result in the necessary characteristics.

It is not required that grains on the entire surface of the member be made finer. The method of making grains finer may be effectively applied only on a portion where fatigue cracks occur readily (i.e., a portion where fatigue damages are expected to be given or a portion where a larger stress than a stress on surrounding portions is locally applied) or a portion where fine cracks have occurred.

EXAMPLE

Examples will be explained below.

Example 1

The friction stir processing and the recrystallization heat treatment were carried out on a plate (50 mm$^t$) under the conditions shown in Table 1 to make a predetermined portion, i.e., the surface of the plate, be a fine structure, while examining the inside of the plate to see if it maintained coarse grains.

TABLE 1

| Material | Depth/ mm | Recrystallization heat treatment | | Average grain size | |
|---|---|---|---|---|---|
| | | Temperature/ ° C. | Time/h | Fine layer/ μm | Inside/mm |
| IN625 | 1.0 | 1050 | 2 | 16 | Approximately 40 |
| | 2.0 | 1050 | 2 | 18 | |
| | 2.7 | 1050 | 2 | 19 | |
| | 3.0 | 1050 | 2 | 18 | |
| | 2.7 | 1050 | 8 | 26 | |
| | 2.7 | 1100 | 1 | 66 | |
| | 2.7 | 1100 | 2 | 96 | |
| SCS16 | 1.0 | 1000 | 1 | 90 | Approximately 10 |
| | 2.0 | 1000 | 1 | 84 | |
| | 2.7 | 1000 | 1 | 93 | |
| | 3.0 | 1000 | 1 | 93 | |
| N263 | 2.0 | 1150 | 1 | 40 | Approximately 0.12 |

A casting material IN625 and a forging material N263 as a Ni-based material, and a casting material SCS16 as a Fe-based material were prepared as test pieces. The grain size in IN625 as the test piece was approximately 70 mm at the maximum and approximately 40 mm on average. The grain size in SCS16 was approximately 10 mm on average. The grain sizes are shown in Table.

After simulated cracks (depth of 1.0 mm, opening width of 0.3 mm) occurred on the surface of N263, N 263 was subjected to aging over an extended period of time (e.g., 8000 h at 900° C.). Then, solution treatment was performed on the surface, and simulated fine crack repair was applied to the material in which oxide was removed from the surface by grinding. Subsequently, friction stir processing was performed on the cracks. Consequently, it was found that grains became finer even through their sizes varied depending on the materials or heat treatment conditions. After the friction stir processing and the recrystallization heat treatment were applied, the outer appearance and cross-section of the surface were observed. It was found that the cracks were disappeared by the simulated crack repair.

Example 2

Creep tests and fatigue tests were carried out for Ni base alloy (IN625) shown in Table 1 to evaluate mechanical characteristics. If these tests were carried out for other heat resistant materials, the same tendency as Ni base alloy could be observed even though an absolute value was varied depending on their structures according to the present invention.

Figure 3:
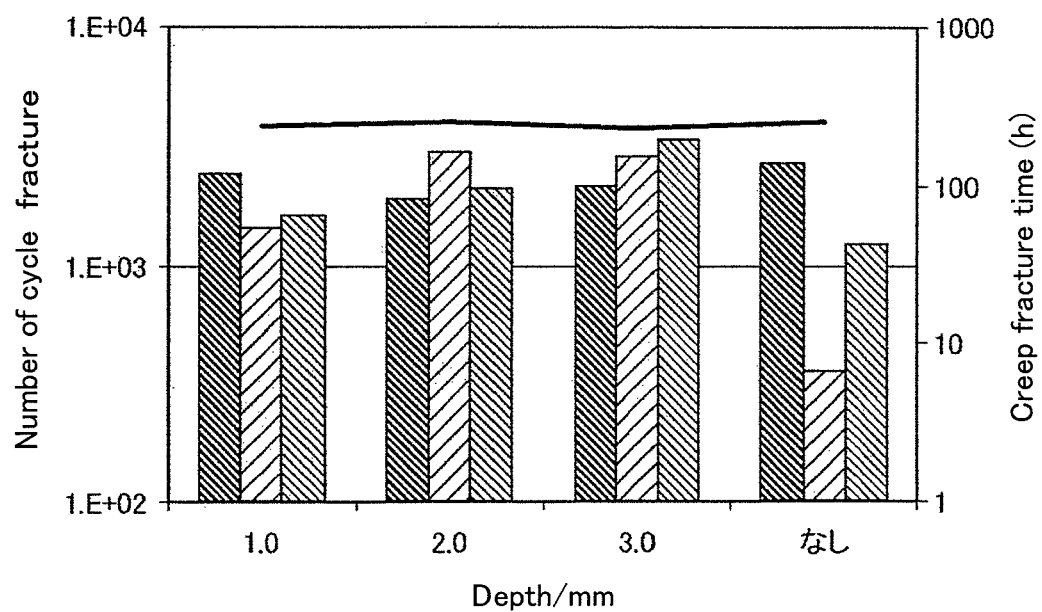
FIG. 3 shows results of Example 2.

The results are shown in FIG. 3. The fatigue tests were low-cycle fatigue tests (three strain-controlled runs were performed at 700° C.), and the creep tests were evaluated under the condition of 750° C. and 150 MPa. As a material, a casting material having the average grain size of approximately 30 mm was used. The FSP and the recrystallization heat treatment were applied to test pieces. The depths of fine recrystallized structure layers were 1.0 mm, 2.0 mm, and 3.0 mm. For comparison, test pieces which were not subjected to treatment (which had no recrystallized structure layer) was also used. Three test pieces were prepared under each condition to evaluate variations. With regard to the test piece (i.e. "no layer") to which the present invention was not applied, the number of cycles to fracture was varied. It was found that the reliability was reduced when the grain size was large. On the other hand, the number of cycles to fracture was not considerably varied in the test pieces to which the present invention was applied.

The creep characteristics were not considerably varied and the creep strength was not reduced by making the grains on the surface finer.

What is claimed is:
1. A method for manufacturing a heat resistant alloy member, the member being made of a Ni-based alloy and comprising a coarse grain layer,
   the method comprising the steps of:
   forming a stirred layer by giving processing strain to at least a part of the surface of the coarse grain layer using a friction stir processing, and
   forming a recrystallized structure layer including finer grains than the coarse grain layer, by applying recrystallization heat treatment to the stirred layer for recrystallization, whereby:
   the recrystallized structure layer is composed of grains having an average size of 1 μm or more and 100 μm or less, and
   a thickness of the recrystallized structure layer is 1 mm or more and 5 mm or less.
2. The method for manufacturing the heat resistant alloy member according to claim 1, wherein the stirred layer is provided at least on a portion of the surface of the coarse grain layer where fatigue damages are expected to be incurred.
3. The method for manufacturing the heat resistant alloy member according to claim 1, wherein the coarse grain layer is composed of grains having an average size of 1 mm or more.

4. The method for manufacturing the heat resistant alloy member according to claim 3, wherein the stirred layer is provided at least on a portion of the surface of the coarse grain layer where fatigue damages are expected to be incurred.

5. A method for repairing a heat resistant alloy member, the member being made of a Ni-based alloy and comprising a coarse grain layer, the method comprising the steps of:

forming a stirred layer by giving processing strain using a friction stir processing to at least a portion of the surface of the member where cracks have occurred due to fatigue damage, and forming a recrystallized structure layer including finer grains than the coarse grain layer, by applying recrystallization heat treatment to the stirred layer for recrystallization, whereby:

the recrystallized structure layer is composed of grains having an average size of 1 μm or more and 100 μm or less, and a thickness of the recrystallized structure layer is 1 mm or more and 5 mm or less.

* * * * *